US012792011B2

(12) United States Patent
Braun et al.

(10) Patent No.: US 12,792,011 B2
(45) Date of Patent: Nov. 10, 2026

(54) METHOD FOR PROVIDING A CONTROLLING FRONTEND FOR AN OPERATING DEVICE

(71) Applicant: ABB Schweiz AG, Baden (CH)

(72) Inventors: Roland Braun, Niederkassel Lülsdorf (DE); Francisco Mendoza, Schriesheim (DE); Tilo Merlin, Linsengericht (DE); Thomas Gamer, Brühl (DE); Mario Hoernicke, Landau (DE)

(73) Assignee: ABB Schweiz AG, Baden (CH)

( * ) Notice: Subject to any disclaimer, the term of this patent is extended or adjusted under 35 U.S.C. 154(b) by 706 days.

(21) Appl. No.: 18/308,802

(22) Filed: Apr. 28, 2023

(65) Prior Publication Data

US 2023/0333540 A1 Oct. 19, 2023

Related U.S. Application Data

(63) Continuation of application No. PCT/EP2021/079949, filed on Oct. 28, 2021.

(30) Foreign Application Priority Data

Oct. 28, 2020 (EP) .................................... 20204475

(51) Int. Cl.
*G05B 19/4155* (2006.01)

(52) U.S. Cl.
CPC .................... *G05B 19/4155* (2013.01); *G05B 2219/31368* (2013.01)

(58) Field of Classification Search
CPC .................................................. G05B 19/4155
See application file for complete search history.

(56) References Cited

U.S. PATENT DOCUMENTS

2004/0073404 A1* 4/2004 Brooks ................ G05B 19/409 702/183
2016/0127514 A1* 5/2016 Maksumov ............. H04W 4/60 709/202

(Continued)

FOREIGN PATENT DOCUMENTS

CN 1950767 A 4/2007
CN 101745545 A 6/2010

(Continued)

OTHER PUBLICATIONS

European Patent Office, International Search Report in International Patent Application No. PCT/EP2021/079949, 7 pp. (Jan. 21, 2022).

(Continued)

*Primary Examiner* — Tarek Chbouki
(74) *Attorney, Agent, or Firm* — Fitch Even Tabin & Flannery LLP

(57) ABSTRACT

A method for providing a controlling frontend for an operating device configured for operating a field device includes providing an operational frame, wherein the operational frame serves as a generic user interface and is based on a companion specification; reading a field device specification from a database, wherein the field device specification comprises a structured set of field device attributes, which are related to the operating elements; and generating, based on the field device specification and the operational frame, a structured set of display elements for the controlling frontend, wherein at least some of the display elements of the controlling frontend are connected to the operating elements of the field device.

10 Claims, 4 Drawing Sheets

(56) References Cited

U.S. PATENT DOCUMENTS

| | | | | |
|---|---|---|---|---|
| 2018/0088548 | A1 | 3/2018 | Sangi | |
| 2019/0114570 | A1* | 4/2019 | Prasad | G06Q 10/06393 |
| 2019/0236672 | A1* | 8/2019 | Coldwell | G06Q 30/0621 |
| 2020/0117336 | A1* | 4/2020 | Mani | G06F 9/453 |
| 2022/0004997 | A1* | 1/2022 | Diamante | H04W 16/22 |

FOREIGN PATENT DOCUMENTS

| | | | | | |
|---|---|---|---|---|---|
| CN | 101893861 | A | | 11/2010 | |
| CN | 102200993 | A | | 9/2011 | |
| CN | 107273108 | A | | 10/2017 | |
| EP | 1501027 | A1 | * | 1/2005 | G06F 30/30 |
| EP | 3163522 | A1 | * | 5/2017 | G06F 3/0484 |
| GB | 2479036 | A | | 9/2011 | |

OTHER PUBLICATIONS

European Patent Office, Written Opinion in International Patent Application No. PCT/EP2021/079949, 7 pp. (Jan. 21, 2022).

China National Intellectual Property Administration, Office Action in Chinese Patent Application No. 202180067265.1, 12 pp. (Jul. 22, 2025).

* cited by examiner

Fig. 4a
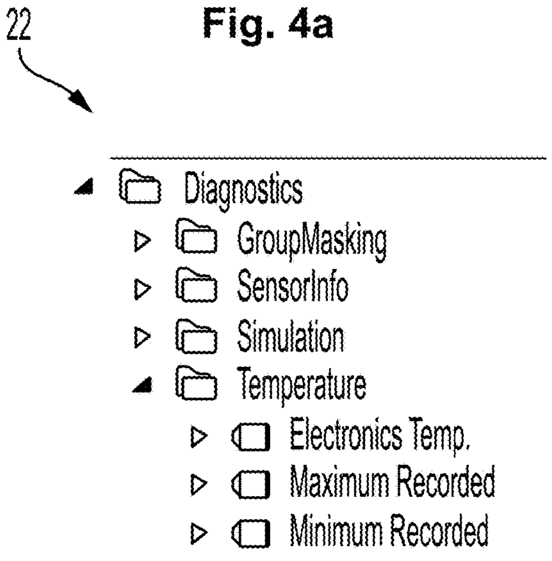
Fig. 4b
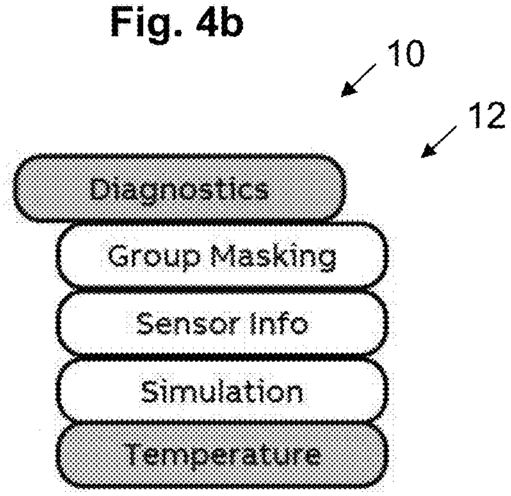
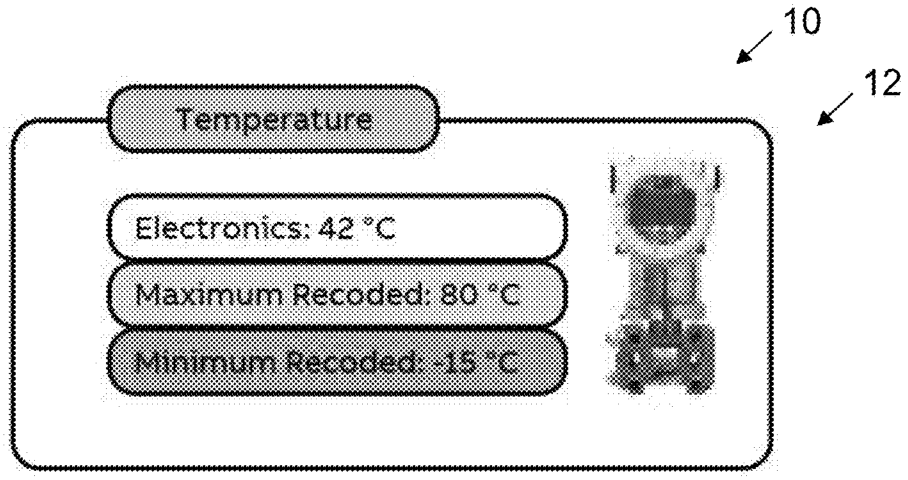
Fig. 4c

METHOD FOR PROVIDING A CONTROLLING FRONTEND FOR AN OPERATING DEVICE

CROSS-REFERENCE TO RELATED APPLICATIONS

This patent application claims priority to International Patent Application No. PCT/EP2021/079949, filed on Oct. 28, 2021, and to European Patent Application No. 20204475.6, filed on Oct. 28, 2020, each of which is incorporated herein in its entirety by reference.

FIELD OF THE DISCLOSURE

The present disclosure relates to the field of industrial system automation, particularly for accessing and/or controlling field devices.

BACKGROUND OF THE INVENTION

In at least some industrial automation systems, a plethora of field devices needs to be controlled or managed. There may exist specifications of at least some of the field devices. However, interaction with the field devices in at least some cases may rely on ad-hoc solutions, which may be error-prone and/or cumbersome.

BRIEF SUMMARY OF THE INVENTION

In a general aspect, the present disclosure describes a system and method for improved controlling or managing field devices. In a more particular aspect, the present disclosure describes a method for providing a controlling frontend for an operating device configured for operating a field device by means of operating elements of the field device. The method comprises the steps of: providing an operational frame, wherein the operational frame serves as a generic user interface and is based on a companion specification; reading a field device specification from a database, wherein the field device specification comprises a structured set of field device attributes, which are related to the operating elements; and generating, based on the field device specification and the operational frame, a structured set of display elements for the controlling frontend, wherein at least some of the display elements of the controlling frontend are connected to the operating elements of the field device.

BRIEF DESCRIPTION OF THE SEVERAL VIEWS OF THE DRAWING(S)

FIGS. 4*a*, 4*b*, and 4*c* schematically depict examples for an aggregated user interface according to an embodiment of the present disclosure.

Figure 5:
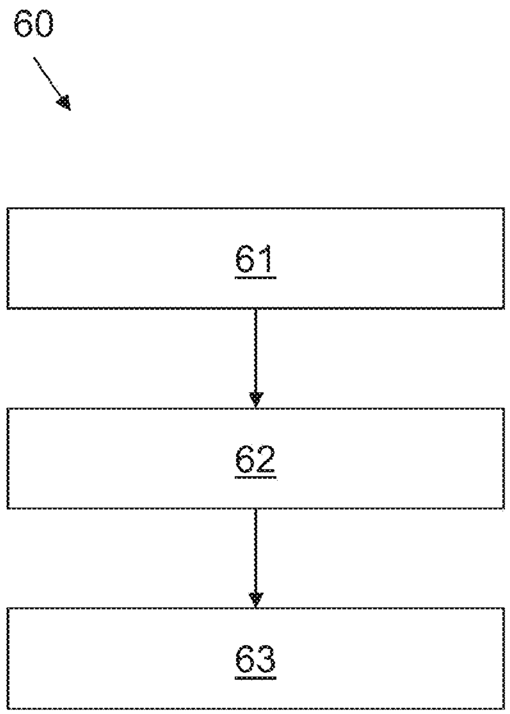

FIG. 5 is a flowchart for a method in accordance with the disclosure.

DETAILED DESCRIPTION OF THE INVENTION

Figure 1:
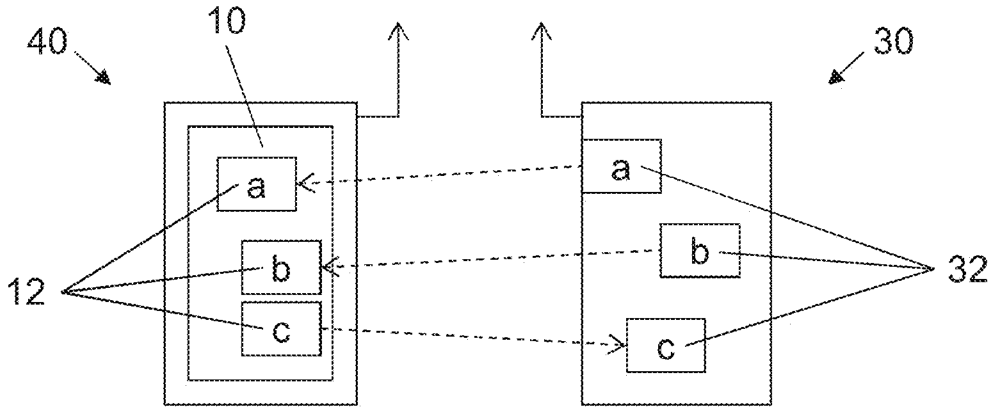
FIG. 1 is a schematic of an exemplary method for operating a field device according to an embodiment of the present disclosure.

FIG. 1 shows schematically an example for operating a field device 30 according to an embodiment. The field device 30 has three operating elements 32, marked as a, b, c. Operating element a may be a sensor, e.g., for temperature, operating element b may be an internal register, e.g., for serial number, current firmware version, and/or other data of field device 30. Operating element c may be an actuator, for example a valve element. The field device 30 is operated by an operating device 40, by means of a controlling frontend 10. The controlling frontend 10 comprises three display elements 12, marked as a, b, c. In the embodiment shown, display element 12 a operates operating element 32 *a*, e.g., by reading data—e.g., measured values—from sensor 32 *a*. The value read from sensor 32 *a* may be one single value, e.g., a current temperature, and/or a set of measured values, e.g., a time-series of temperatures. Analogously, data read from sensor 32 *b* may be one single value, e.g., one register entry, and/or a set of entries, e.g., of a plurality of internal registers. A value sent from display element 12 *c* to operating element 32 *c* may be one or more values that steer the heating element.

Figure 2:
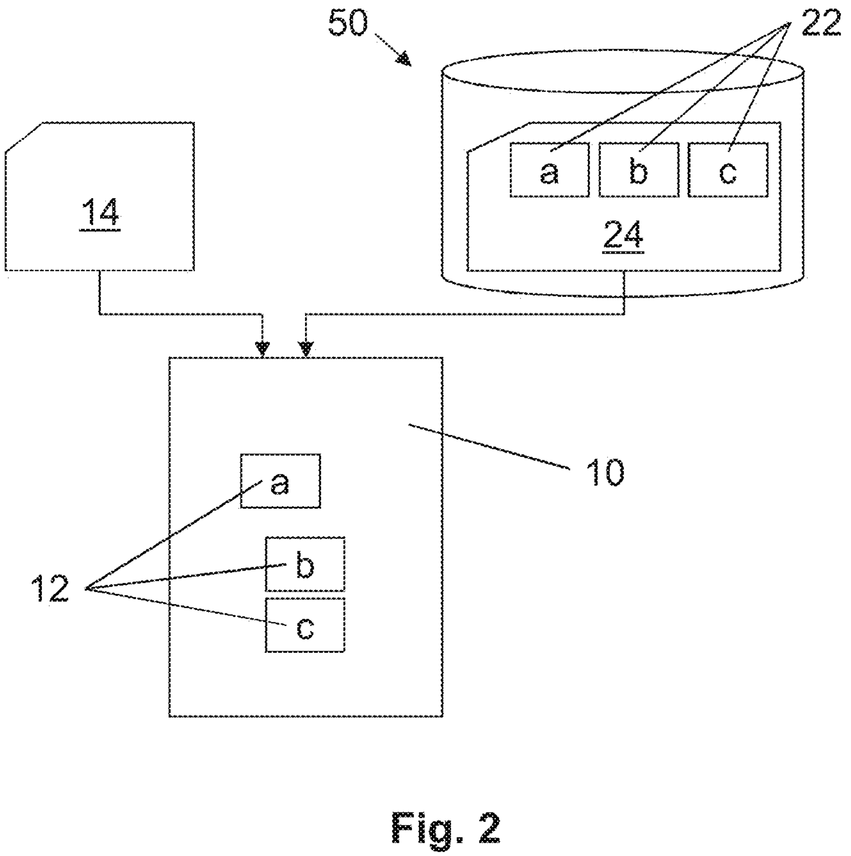
FIG. 2 is a schematic of an exemplary implementation for a method for providing a controlling frontend according to an embodiment of the present disclosure.

FIG. 2 shows schematically an example for providing a controlling frontend 10 according to an embodiment. One input for generating the controlling frontend 10 may be an operational frame 14. The operational frame 14 may be based on a companion specification. Another input may be a field device specification 24. The field device specification 24 may comprise a structured set of field device attributes 22, which are related to the operating elements 32. The field device specification 24 may be part of a database 50. The database 50 may comprise a plurality of field device specifications 24—e.g., of a plurality of field devices 30—and/or further data. The database 50 may be located on the field device 30, on the operating device 40, on a server, and/or on an aggregation server.

Figure 3:
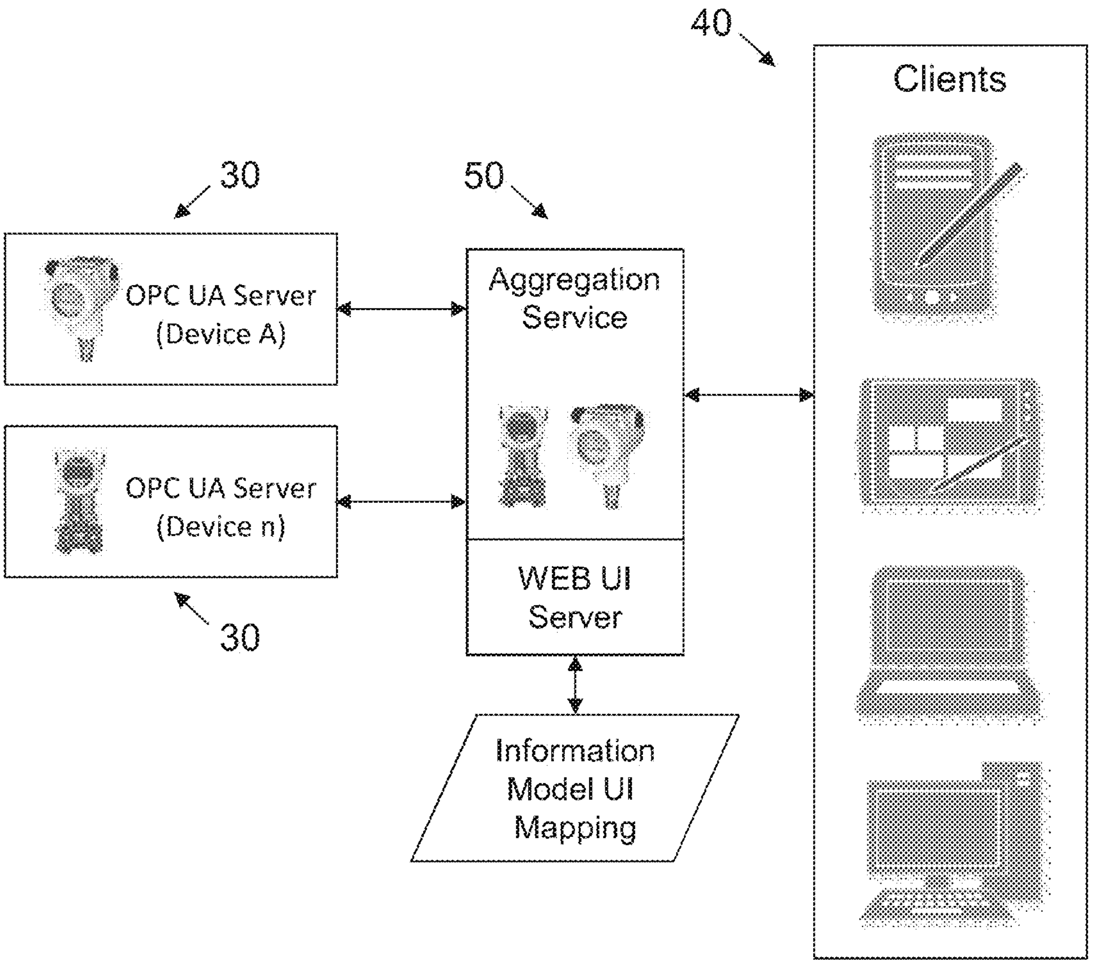
FIG. 3 is a schematic of an exemplary embodiment for an aggregating service according to an embodiment of the present disclosure.

FIG. 3 shows schematically an example for an aggregating service according to an embodiment. The aggregating service may run on a database 50. The database 50 may comprise a plurality of field device specifications 24 (see FIG. 2)—e.g., of a plurality of field devices 30—and/or further data. This enables an Aggregation Service to provide additional usability services based, e.g., on a web server interface. This may offer web-technology-based user dialogs, which may run on Clients or operating devices 40, to support users in their interaction with an OPC UA connected device. The user dialogs may run on a controlling frontend 10 on the operating devices 40. The controlling frontend 10 may be generated from OPC UA Server implemented Address Spaces, which applies knowledge from specified information models (OPC UA Specifications), as it envisions using configuration data to control the rendering process regarding layout and/or graphical styles, such as fonts, colours, etc. Furthermore, to be able also to support OPC UA Applications that do not follow a standardized information model, it may, additionally or as an alternative, be possible to manage specific UI (user interface) configuration data per OPC UA Server instance. The UI configuration concept may include a cascaded approach that allows OPC UA Server Instance specific extensions on top of the Information Model based UI configuration rules. Additionally, or as an alternative, the usability services in exceptional cases may be as limited as providing a simple WEB API (such as RESTful services) to web clients, which in turn implement the user dialogs. Advantageously, at least some implementations of this concept only require widespread WEB technologies and interfaces, so that no OPC UA-specifics have to be known in order to configure OPC UA devices and thereby, configure or re-configure the monitoring and control of an industrial process.

FIGS. 4a to 4c shows schematically an example for an aggregated user interface according to an embodiment. FIG. 4a shows a representation of (a part of) a structured set of field device attributes 22. In the abstraction level shown, entries "Group Masking", "Sensor Info", "Simulation", and "Temperature" are available. FIG. 4b shows how these field device attributes 22 have been transformed into a structured set of display elements 12, as displayed on a controlling frontend 10. Activating the display element "Temperature"—i.e., touching or clicking, depending on the kind of display used in operating device 40—may lead to a look of the controlling frontend 10 as shown in FIG. 4c. This figure shows a structured set of display elements 12, displayed as a sub-menu of "Temperature."

FIG. 5 shows a flow diagram 60 according to an embodiment. A method for providing a controlling frontend 10 (see previous figures) for an operating device 40 comprises the steps 61 to 63. In a step 61, an operational frame 14 is provided, wherein the operational frame 14 is based on a companion specification. In a step 62, a field device specification 24 is read from a database 50. The field device specification 24 comprises a structured set of field device attributes 22, which are related to the operating elements 32. In a step 63, a structured set of display elements 12 for the controlling frontend 10 is generated, based on the field device specification 24 and the operational frame 14. At least some of the display elements 12 of the controlling frontend 10 are connected to the operating elements 32 of the field device 30.

LIST OF REFERENCE SYMBOLS

P1 10 controlling front-end
P1 12 display elements
P1 14 operational frame
P1 22 device attributes
P1 24 field device specification
P1 30 field device
P1 32 operating elements
P1 40 operating device
P1 50 database
P1 60 flow diagram
P1 61-63 steps In the context of the present disclosure, a field device may be any device that is part of and/or is used in an industrial automation system. In at least some automation systems, the field device is controlled, steered or operated by an operating device. The operating device may be a mobile device, for instance a tablet or smartphone, it may be a server in a control centre, and/or another computing device. The operating device may perform the control by a controlling frontend, which may be implemented as a specialized program, e.g., as a so called "app", and/or a web-based program, e.g., a script, a plug-in and/or a web-client. The controlling frontend may sometimes be called an operating frontend, a management frontend, or an OAM frontend (OAM: Operation, Administration and Maintenance). The controlling frontend may comprise operating elements, e.g., depicted as "control boxes" on a display of the operating device. For instance, tapping or otherwise activating one of the operating elements may start an electric motor, other operating elements may stop the motor, initiate a temperature measurement, and/or other actions.

The operational frame may be based on a companion specification and/or generated from the companion specification. The operational frame may serve as a "basic" or "generic" user interface for the controlling frontend. The operational frame may provide some basic elements, such as buttons for "Start", "End", "Configuration", etc., and preconfigured user dialogs. The operational frame may be based on at least one element of a companion specification.

The companion specification may comprise specified information models, for instance PA-DIM (Process Automation—Device Information Model) according to OPC 30081 or DI (Device Integration) according to OPC 10000-100, particularly Part 100: Device Information Model. The companion specification may at least comprise a part of the information required to infer a structure of an HMI (Human Machine Interface). Said information may comprise device parameters' metadata, methods and their functional coherence, company-specifics. The companion specification may comprise company style information, e.g., a preferred "company color", a preferred font, etc. The company style information may comprise trademark-relevant or otherwise IP-relevant elements, for instance a name of the company or the product line, a registered company colour and/or a registered design.

The information may be used to control, e.g., a rendering process regarding layout and graphical styles, such as fonts, colours, etc. Said information may be enriched, e.g., by a position and/or size of the operating elements, and/or further data. For instance, FunctionalGroups specified in the DI model may be used to structure user menus. A FunctionalGroup may define a functional coherence between device's parameters, methods, and other functional groups.

For an information of the components and/or operating elements of the field device that are to be controlled, a field device specification from a database may be read. The field device specification may comprise a structured set of field device attributes, which are related at least to the operating elements. The structured set may be structured hierarchically and/or otherwise, e.g., as tuples. The field device specification may comprise standardized information models, e.g., specified in OPC UA companion specification like PA-DIM (OPC 30081) or DI (OPC 10000-100). The database may be localized on one or more devices, e.g., on a server, on the operating device, on the field device, and/or other computing devices. Particularly, the database may be localized on and/or derived from an aggregation server, e.g., an OPC UA Aggregating Service (OPC: Open Platform Communications, UA: Unified Architecture), e.g., as an aggregated OPC UA Server instance. In the context of Modular Automation, an aggregating OPC UA Server may be used to integrate the Modules of an Automation System into a common Address Space. The Modules of an Automation System implement the OPC UA Servers (Aggregates). Additionally, the companion specifications may provide standard interfaces between OPC UA connected applications. The specifications may be inferred from information models. The specifications may include a cascaded approach that allows OPC UA Server Instance specific extensions on top of the Information Model based UI configuration rules. The field device attributes may, for example, comprise sensors, actuators, static properties like a serial number of the device, and/or other entries.

The field device specification, the operational frame, and/or further information may be used to generate a structured set of display elements for the controlling frontend.

This may be structured to a "user menu" and/or a set of menus. The display elements may serve for displaying data, e.g., sensor data or data of the field device's properties, for steering an actuator, and/or further information. A hierarchically structured specification may be used as a basis for generating boxes, whose activation opens an access to a "next level menu". The generating may comprise an x/y location, width/height, colour, etc. of each display element, either specified or generated, e.g., by a graph generator. The display elements may be activated, e.g., by a click, touch, hover, entering letters, and/or by further inputs, e.g., inputs as defined as "JavaScript events". Activating the display elements may lead to an action, for instance to open a sub-window and/or a user dialog, to display and/or update current sensor data, to steer an actuator, etc. At least some of the display elements of the controlling frontend are connected to the operating elements of the field device and, thus, lead to an action on the field device and/or contribute to operating the field device. Being connected may comprise to be logically and/or physically connected to the field device. Being connected to the operating elements of the field device may be implemented by a communication protocol, e.g., based on wireless and/or wired connection means.

Particularly, the method provides an automated, rule based "View Model" Generator, which is able to operate a field device. The View Model may be understood as a sort of an intermediate layer between the View (HMI) and the Model (Data). The View Model may prepare and/or convert data to simplify the visualization. This may close a gap in the usability of OPC UA connected filed devices, because the actions that can be run by the controlling frontend are consistent to its specification(s). This may a flexible and consistent device integration concept, particularly for field devices. The method may contribute to a scalable diagnostic and visualization approach. Further, it may address needs like user-friendly configuration, monitoring, and/or further OAM tasks (OAM: Operation, Administration and Maintenance). The method may be applied to various types of applications, web-clients, and/or other program modules. The method opens means for an applicability across vendors and technologies. On the other hand, this may allow OPC UA Server Instance specific extensions. Additionally, or as an alternative, the usability services in some cases may be limited to providing a simple WEB API (such as RESTful services) to web clients, which in turn implement the user dialogs.

In various embodiments, the operating elements are at least one of: a sensor, an actuator, and/or a register entry. The register entry may comprise static data like a serial number, and/or data like diagnostic data.

In various embodiments, the companion specification comprises a specification of a layout and/or of a graphical style of the display elements, and/or further elements of a company style. For instance, fonts, colours, logos, and/or further elements may be provided that improve the usability and/or to recognize the controlling frontend and/or the controlled devices as belonging to a certain company. The companion specification and/or its further elements may comprise company style information, e.g., a preferred "company colour", a preferred font, etc. The company style information may comprise trademark-relevant or otherwise IP-relevant elements, for instance a name of the company or the product line, a registered company colour and/or a registered design.

In some embodiments, the display elements are hierarchically structured. This may be a structured basis to cope with the control even of complicated field device.

In some embodiments, the address space of the device is compliant with a companion specification according to OPC 30081, OPC 10000-100, OPC Unified Architecture for IEC61850, MDIS OPC UA Companion Specification, OPC Unified Architecture for Analyzer Devices (ADI) and/or another companion specification and/or is compliant with an aggregated service. The aggregated service may enable a common point of access for at least some of the devices, in some embodiments even for all the devices, of an industrial automation system. The standard compliance, further, provides a standardized approach, thus contributing to improved specifications and/or to (better) interoperability among several systems.

In various embodiments, the at least a part of the field device specification and/or the field device attributes is compliant with a Unified Architecture of Open Platform Communications, OPC UA.

In various embodiments, activating one of the display elements is related to a display element action, wherein the display element action comprises at least one of: displaying a sub-menu, steering an operating element of the field device, performing an authentication, and/or performing a NOP-operation (NOP: no operation).

The activating may depend on the kind of display, e.g., touch on devices with a touchpad, click or hover on mouse-based devices, and/or further inputs. A sub-menu or sub-window may particularly be used for hierarchically structured display elements. The steering may comprise, e.g., activating an actuator, displaying and/or updating current sensor data, re-reading and/or writing a register entry, and/or further ones. The NOP-operation may be used when an action does not make sense, e.g., when activating a display element "serial number", where (e.g.) an updating does not bring another result.

In some embodiments, the display elements of the controlling frontend being connected to the operating elements of the field device requires an authorization of the controlling frontend and/or of the operating device. This may provide a protection against unsolicited access to the field device.

In some embodiments, the operating device is a smartphone, tablet, a laptop, a specialized device, and/or another type of mobile device, a stationary device, and/or a server. The stationary device may, e.g., be a desktop computer, a server, e.g., in a cloud. This opens the method to a broad range of devices to run on.

In various embodiments, the database is located on the field device, on the operating device, on a server, and/or on an aggregation server. The Aggregation Server and/or or Aggregation Service may be compliant to OPC UA.

An aspect relates to a program element and/or computer program product comprising instructions, which, when the program is executed by a computer, cause the computer to carry out the method as described above and/or below.

An aspect relates to a computer-readable storage medium where a computer program or a computer program product as described above is stored on.

An aspect relates to an aggregation server, configured for aggregating information of a plurality of field devices, wherein the information comprises a structured set of field device attributes and usability services for the field devices.

In some embodiments, the aggregation server is compliant with IEC 62541.1, which is incorporated herein in its entirety by reference.

An aspect relates to a use of a method as described above and/or below for steering field devices of an industrial automation system and/or for providing a controlling frontend for the field devices.

For further clarification, the invention is described by means of embodiments shown in the figures. These embodiments are to be considered as examples only, but not as limiting.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for providing a controlling frontend for an operating device configured for operating a field device by utilizing operating elements of the field device, the method comprising:

providing an operational frame, wherein the operational frame serves as a generic user interface and is based on a companion specification comprising specified information models and is generated from the companion specification;

reading a field device specification from a database, wherein the field device specification comprises a structured set of field device attributes, which are related to the operating elements, and wherein the database is located on an aggregation server as an aggregated Open Platform Communications (OPC) Unified Architecture (UA) Server instance; and generating, based on the field device specification and the operational frame, a structured set of display elements for the controlling frontend, wherein the controlling frontend is generated from OPC UA Server implemented Address Spaces, which applies knowledge from specified information models (OPC UA Specifications), as it envisions using configuration data to control the rendering process regarding layout and/or graphical styles, such as fonts, colours, etc., and wherein the configuration data includes a cascaded approach that allows OPC UA Server Instance specific extensions on top of the Information Model based User Interface (UI) configuration rules, wherein at least some of the display elements of the controlling frontend are connected to the operating elements of the field device.

2. The method of claim 1, wherein the operating elements are at least one of: a sensor, an actuator, and/or a register entry.

3. The method of claim 1, wherein the companion specification comprises a specification of a layout and/or of a graphical style of the display elements, and/or further elements of a company style.

4. The method of claim 1, wherein the display elements are hierarchically structured.

5. The method of claim 1, wherein an address space of the device is compliant with a companion specification according to specification documents OPC 30081, OPC 10000-100, OPC Unified Architecture for IEC61850, Master Control Station to Distributed Control System Interface Standardization (MDIS) OPC UA Companion Specification, OPC Unified Architecture for Analyzer Devices (ADI) and/or another companion specification and/or is compliant with an aggregated service.

6. The method of claim 1, wherein at least a part of the field device specification and/or the field device attributes is compliant with a Unified Architecture of Open Platform Communications, OPC UA.

7. The method of claim 1, wherein the display elements are hierarchically structured, and wherein activating one of the display elements is related to a display element action, wherein the display element action comprises at least one of:

displaying a sub-menu of the structured set of display elements, wherein a hierarchically structured specification is used as a basis for generating boxes, whose activation opens an access to a next level menu, performing an authentication, wherein the display elements of the controlling frontend being connected to the operating elements of the field device requires an authorization of the controlling frontend and/or of the operating device, and wherein the authorization is performed before steering an operating element of the field device, performing a No-Operation (NOP)-operation, the NOP-operation indicating that no operation is performed, when an action does not make sense, when activating a display element "serial number", where an updating does not bring another result.

8. The method of claim 1, wherein the display elements of the controlling frontend being connected to the operating elements of the field device requires an authorization of the controlling frontend and/or of the operating device.

9. The method of claim 1, wherein the operating device is a smartphone, a tablet, a laptop, a specialized device, or another type of mobile device, a stationary device, or a server.

10. The method of claim 1, wherein the database is located on the field device, on the operating device, on a server, or on an aggregation server.

* * * * *